US009639532B2

(12) United States Patent
Raichelgauz et al.

(10) Patent No.: US 9,639,532 B2
(45) Date of Patent: May 2, 2017

(54) CONTEXT-BASED ANALYSIS OF MULTIMEDIA CONTENT ITEMS USING SIGNATURES OF MULTIMEDIA ELEMENTS AND MATCHING CONCEPTS

(71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 520 days.

(21) Appl. No.: 14/096,901

(22) Filed: Dec. 4, 2013

(65) Prior Publication Data

US 2014/0095536 A1     Apr. 3, 2014

Related U.S. Application Data

(63) Continuation-in-part of application No. 13/624,397, filed on Sep. 21, 2012, now Pat. No. 9,191,626, which
(Continued)

(30) Foreign Application Priority Data

Oct. 26, 2005  (IL) .......................... 171577
Jan. 29, 2006  (IL) .......................... 173409
Aug. 21, 2007  (IL) .......................... 185414

(51) Int. Cl.
*G06F 17/30*      (2006.01)
*H04H 60/37*      (2008.01)
(Continued)

(52) U.S. Cl.
CPC ....... *G06F 17/30023* (2013.01); *H04H 60/37* (2013.01); *H04H 60/58* (2013.01);
(Continued)

(58) Field of Classification Search
None
See application file for complete search history.

(56) References Cited

U.S. PATENT DOCUMENTS 4,972,363 A   11/1990 Nguyen et al.
5,806,061 A    9/1998 Chaudhuri et al.
(Continued)

FOREIGN PATENT DOCUMENTS

WO        02/31764       4/2002
WO     2003005242 A1    1/2003
WO     2007/0049282     5/2007

OTHER PUBLICATIONS

Yanai, Keiji. Generic Image Classification Using Visual Knowledge on the Web. MM'03, Nov. 2-8, 2003. pp. 167-176.*
(Continued)

*Primary Examiner* — Stanley K Hill
*Assistant Examiner* — Robert H Bejcek, II
(74) *Attorney, Agent, or Firm* — M&B IP Analysts, LLC

(57) ABSTRACT

A method and server for analyzing a multimedia content item are provided. The method comprises receiving a multimedia content item; extracting from the multimedia content item a plurality of multimedia elements; generating at least one signature for each of the plurality of multimedia elements; for each of the plurality of multimedia elements, querying a deep-content-classification (DCC) system to identify at least one concept that matches one of the plurality of multimedia elements, wherein querying is performed using the at least one signature generated for the multimedia elements and wherein an unidentified multimedia content element does not have a matching concept; generating a context for the multimedia content item using matching concepts; and characterizing each unidentified multimedia element using the generating context and signatures of the matching concepts.

22 Claims, 5 Drawing Sheets

Related U.S. Application Data is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 61/839,883, filed on Jun. 27, 2013.

(51) Int. Cl.

| | | |
|---|---|---|
| H04N 7/173 | (2011.01) | |
| H04N 21/258 | (2011.01) | |
| H04N 21/2668 | (2011.01) | |
| H04N 21/466 | (2011.01) | |
| H04N 21/81 | (2011.01) | |
| H04H 60/58 | (2008.01) | |
| H04H 60/59 | (2008.01) | |
| H04H 60/64 | (2008.01) | |
| H04H 60/73 | (2008.01) | |

(52) U.S. Cl.
CPC ............ *H04H 60/59* (2013.01); *H04H 60/64* (2013.01); *H04H 60/73* (2013.01); *H04N 7/17318* (2013.01); *H04N 21/25891* (2013.01); *H04N 21/2668* (2013.01); *H04N 21/466* (2013.01); *H04N 21/8106* (2013.01)

(56) References Cited

U.S. PATENT DOCUMENTS

| | | | |
|---|---|---|---|
| 5,852,435 | A | 12/1998 | Vigneaux et al. |
| 5,870,754 | A * | 2/1999 | Dimitrova ......... G06F 17/30799 |
| 5,873,080 | A | 2/1999 | Coden et al. |
| 5,887,193 | A | 3/1999 | Takahashi et al. |
| 5,978,754 | A | 11/1999 | Kumano |
| 6,052,481 | A | 4/2000 | Grajski et al. |
| 6,076,088 | A | 6/2000 | Paik et al. |
| 6,122,628 | A | 9/2000 | Castelli et al. |
| 6,128,651 | A | 10/2000 | Cezar |
| 6,144,767 | A | 11/2000 | Bottou et al. |
| 6,147,636 | A | 11/2000 | Gershenson |
| 6,243,375 | B1 | 6/2001 | Speicher |
| 6,243,713 | B1 | 6/2001 | Nelson et al. |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,524,861 | B1 | 2/2003 | Anderson |
| 6,594,699 | B1 | 7/2003 | Sahai et al. |
| 6,611,628 | B1 | 8/2003 | Sekiguchi et al. |
| 6,618,711 | B1 | 9/2003 | Ananth |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,704,725 | B1 | 3/2004 | Lee |
| 6,751,363 | B1 * | 6/2004 | Natsev .................. G06K 9/522 |
| | | | 358/403 |
| 6,751,613 | B1 | 6/2004 | Lee et al. |
| 6,754,435 | B2 | 6/2004 | Kim |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 * | 10/2004 | Krishnamachari H04N 1/32101 |
| | | | 348/571 |
| 6,819,797 | B1 | 11/2004 | Smith et al. |
| 6,845,374 | B1 | 1/2005 | Oliver et al. |
| 6,901,207 | B1 | 5/2005 | Watkins |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,043,473 | B1 | 5/2006 | Rassool et al. |
| 7,047,033 | B2 | 5/2006 | Wyler |
| 7,199,798 | B1 | 4/2007 | Echigo et al. |
| 7,260,564 | B1 | 8/2007 | Lynn et al. |
| 7,277,928 | B2 | 10/2007 | Lennon |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,526,607 | B1 | 4/2009 | Singh et al. |
| 7,536,417 | B2 | 5/2009 | Walsh et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,660,737 | B1 | 2/2010 | Lim et al. |
| 7,694,318 | B2 | 4/2010 | Eldering et al. |
| 7,697,791 | B1 | 4/2010 | Chan et al. |
| 7,769,221 | B1 | 8/2010 | Shakes et al. |
| 7,788,132 | B2 | 8/2010 | Desikan et al. |
| 7,836,054 | B2 | 11/2010 | Kawai et al. |
| 7,860,895 | B1 | 12/2010 | Scofield et al. |
| 7,904,503 | B2 | 3/2011 | Van De Sluis |
| 7,920,894 | B2 | 4/2011 | Wyler |
| 7,921,107 | B2 | 4/2011 | Chang et al. |
| 7,974,994 | B2 | 7/2011 | Li et al. |
| 7,987,194 | B1 | 7/2011 | Walker et al. |
| 7,991,715 | B2 | 8/2011 | Schiff et al. |
| 8,000,655 | B2 | 8/2011 | Wang et al. |
| 8,036,893 | B2 | 10/2011 | Reich |
| 8,098,934 | B2 | 1/2012 | Vincent et al. |
| 8,266,185 | B2 | 9/2012 | Raichelgauz et al. |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,345,982 | B2 | 1/2013 | Gokturk et al. |
| 8,548,828 | B1 | 10/2013 | Longmire |
| 8,655,801 | B2 | 2/2014 | Raichelgauz et al. |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,799,195 | B2 | 8/2014 | Raichelgauz et al. |
| 8,799,196 | B2 | 8/2014 | Raichelquaz et al. |
| 8,818,916 | B2 | 8/2014 | Raichelgauz et al. |
| 8,868,619 | B2 | 10/2014 | Raichelgauz et al. |
| 8,880,539 | B2 | 11/2014 | Raichelgauz et al. |
| 8,880,566 | B2 | 11/2014 | Raichelgauz et al. |
| 8,886,648 | B1 | 11/2014 | Procopio et al. |
| 8,898,568 | B2 | 11/2014 | Bull et al. |
| 8,922,414 | B2 | 12/2014 | Raichelgauz et al. |
| 8,959,037 | B2 | 2/2015 | Raichelgauz et al. |
| 8,990,125 | B2 | 3/2015 | Raichelgauz et al. |
| 9,009,086 | B2 | 4/2015 | Raichelgauz et al. |
| 9,031,999 | B2 | 5/2015 | Raichelgauz et al. |
| 9,087,049 | B2 | 7/2015 | Raichelgauz et al. |
| 9,104,747 | B2 | 8/2015 | Raichelgauz et al. |
| 9,191,626 | B2 | 11/2015 | Raichelgauz et al. |
| 9,197,244 | B2 | 11/2015 | Raichelgauz et al. |
| 9,218,606 | B2 | 12/2015 | Raichelgauz et al. |
| 9,235,557 | B2 | 1/2016 | Raichelgauz et al. |
| 9,256,668 | B2 | 2/2016 | Raichelgauz et al. |
| 9,330,189 | B2 | 5/2016 | Raichelgauz et al. |
| 2001/0019633 | A1 | 9/2001 | Tenze et al. |
| 2001/0056427 | A1 * | 12/2001 | Yoon ................ G06F 17/30817 |
| 2002/0038299 | A1 | 3/2002 | Zernik et al. |
| 2002/0059580 | A1 | 5/2002 | Kalker et al. |

(56) References Cited

U.S. PATENT DOCUMENTS

| | | |
|---|---|---|
| 2002/0087530 A1 | 7/2002 | Smith et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0143976 A1 | 10/2002 | Barker et al. |
| 2002/0152267 A1 | 10/2002 | Lennon |
| 2002/0159640 A1 | 10/2002 | Vaithilingam et al. |
| 2002/0163532 A1* | 11/2002 | Thomas ............ G06F 17/30814 715/723 |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0086627 A1 | 5/2003 | Berriss et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1* | 7/2004 | Sun ...................... H04L 9/3247 713/176 |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0131884 A1 | 6/2005 | Gross et al. |
| 2005/0144455 A1 | 6/2005 | Haitsma |
| 2005/0177372 A1 | 8/2005 | Wang et al. |
| 2006/0013451 A1 | 1/2006 | Haitsma |
| 2006/0020860 A1 | 1/2006 | Tardif et al. |
| 2006/0026203 A1 | 2/2006 | Tan et al. |
| 2006/0031216 A1 | 2/2006 | Semple et al. |
| 2006/0048191 A1 | 3/2006 | Xiong |
| 2006/0064037 A1 | 3/2006 | Shalon et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0019864 A1 | 1/2007 | Koyama et al. |
| 2007/0042757 A1 | 2/2007 | Jung et al. |
| 2007/0061302 A1 | 3/2007 | Ramer et al. |
| 2007/0067682 A1 | 3/2007 | Fang |
| 2007/0071330 A1 | 3/2007 | Oostveen et al. |
| 2007/0074147 A1 | 3/2007 | Wold |
| 2007/0130159 A1 | 6/2007 | Gulli et al. |
| 2007/0168413 A1 | 7/2007 | Barletta et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0023400 A1 | 1/2010 | Dewitt |
| 2010/0042646 A1 | 2/2010 | Raichelgauz et al. |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0162405 A1 | 6/2010 | Cook et al. |
| 2010/0173269 A1 | 7/2010 | Puri et al. |
| 2010/0191567 A1 | 7/2010 | Lee et al. |
| 2010/0268524 A1 | 10/2010 | Nath et al. |
| 2010/0306193 A1* | 12/2010 | Pereira ............... G06F 17/30784 707/728 |
| 2010/0318493 A1 | 12/2010 | Wessling |
| 2010/0322522 A1 | 12/2010 | Wang et al. |
| 2011/0035289 A1 | 2/2011 | King et al. |
| 2011/0052063 A1* | 3/2011 | McAuley ............... G06K 9/527 382/180 |
| 2011/0055585 A1 | 3/2011 | Lee |
| 2011/0106782 A1 | 5/2011 | Ke et al. |
| 2011/0145068 A1 | 6/2011 | King et al. |
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2015/0289022 A1 | 10/2015 | Gross |

OTHER PUBLICATIONS

Vailaya, Aditya. Content-Based Hierarchical Classification of Vacation Images. Vailaya, "Content-based hierarchical classification of vacation images", I.E.E.E : Multimedia Computing and Systems, 1999; pp. 518-523 vol. 1.*

Brecheisen et al. Hierarchical Genre Classification for Large Music Collections. ICME 2006. 1388. pp. 1385-1388.*

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

(56) References Cited

OTHER PUBLICATIONS

Semizarov et al. "Specificity of Short Interfering RNA Determined through Gene Expression Signatures", PNAS, 2003, pp. 6347-6352.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSAP.2011.5947337 IEEE Conference Publications, France.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Boari et al, "Adaptive Routing for Dynamic Applications in Massively Parallel Architectures", 1995 IEEE, Spring 1995.
Cococcioni, et al, "Automatic Diagnosis of Defects of Rolling Element Bearings Based on Computational Intelligence Techniques", University of Pisa, Pisa, Italy, 2009.
Ennami, et al, "Role of Spatiotemporal Oriented Energy Features for Robust Visual Tracking in Video Surveillance, University of Queensland", St. Lucia, Australia, 2012.
Garcia, "Solving the Weighted Region Least Cost Path Problem Using Transputers", Naval Postgraduate School, Monterey, California, Dec. 1989.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Foote, Jonathan, et al. "Content-Based Retrieval of Music and Audio", 1997 Institute of Systems Science, National University of Singapore, Singapore (Abstract).
Ribert et al. "An Incremental Hierarchical Clustering", Visicon Interface 1999, pp. 586-591.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cernansky et al., "Feed-forward Echo State Networks"; Proceedings of International Joint Conference on Neural Networks, Montreal, Canada, Jul. 31-Aug. 4, 2005.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Freisleben et al., "Recognition of Fractal Images Using a Neural Network", Lecture Notes in Computer Science, 1993, vol. 6861, 1993, pp. 631-637.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
IPO Examination Report under Section 18(3) for corresponding UK application No. GB1001219.3, dated May 30, 2012.
IPO Examination Report under Section 18(3) for corresponding UK application No. GB1001219.3, dated Sep. 12, 2011.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Maass, W. et al.: "Computational Models for Generic Cortical Microcircuits", Institute for Theoretical Computer Science, Technische Universitaet Graz, Graz, Austria, published Jun. 10, 2003.
International Search Report for the corresponding International Patent Application PCT/IL2006/001235; Date of Mailing: Nov. 2, 2008.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251. German National Research Center for Information Technology.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

(56) References Cited

OTHER PUBLICATIONS

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
International Search Authority: "Written Opinion of the International Searching Authority" (PCT Rule 43bi5.1) including International Search Report for International Patent Application No. PCT/US2008/073852; Date of Mailing: Jan. 28, 2009.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, et al., "Robust Digital Signature for Multimedia Authentication: A Summary", IEEE Circuits and Systems Magazine, 4th Quarter 2003, pp. 23-26.
May et al., "The Transputer", Springer-Verlag, Berlin Heidelberg, 1989, teaches multiprocessing system.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Chuan-Yu Cho, et al., "Efficient Motion-Vector-Based Video Search Using Query by Clip", 2004, IEEE, Taiwan, pp. 1-4.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Nam, et al., "Audio Visual Content-Based Violent Scene Characterization", Department of Electrical and Computer Engineering, Minneapolis, MN, 1998, pp. 353-357.
Shih-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE conference Publications.

* cited by examiner

CONTEXT-BASED ANALYSIS OF MULTIMEDIA CONTENT ITEMS USING SIGNATURES OF MULTIMEDIA ELEMENTS AND MATCHING CONCEPTS

CROSS-REFERENCE TO RELATED APPLICATIONS

This application claims the benefit of U.S. provisional application No. 61/839,883 filed Jun. 27, 2013 and is a continuation-in-part (CIP) of U.S. patent application Ser. No. 13/624,397 filed on Sep. 21, 2012, now U.S. Pat. No. 9,191,626. The Ser. No. 13/624,397 application is a CIP of:

(a) U.S. patent application Ser. No. 13/344,400 filed on Jan. 5, 2012, now U.S. Pat. No. 8,959,037, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and, (c) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to an analysis of a multimedia content item, and more specifically to a system and method for identifying concepts of the multimedia content item.

BACKGROUND

With the abundance of multimedia content made available through various means in general and the Internet in particular, there is also a need to provide effective ways for searching, processing and analyzing multimedia content items. However, such a task may be challenging due the complexity of the content and the volumes of pictures, video clips, images and graphics currently available.

A multimedia content item, e.g., a picture, is a composition of many details (multimedia elements). In some cases, the multimedia elements can be of help in identifying the content or the context of the picture, but in most cases the multimedia elements provide no information that can help in identifying the content or other multimedia elements within the multimedia content item.

For example, a picture containing a multimedia element (e.g., of a Mickey Mouse hat) provides a good indication that the picture (multimedia content item) can be identified as being related to "Mickey Mouse". But such a picture may also include less well known multimedia elements. Such multimedia elements may be less effective and more complicated to handle because they are not necessarily associated with the known figure, e.g., "Mickey Mouse", or the information about them is limited. As another example, multimedia elements within an old video clip (multimedia content item) posted on YouTube® showing a cowboy hat, a horse, a saddle, etc. may be relatively easy to analyze, but identifying who is the man wearing the cowboy hat and riding the horse may be a complex task, especially, when there are no common references to that man, for example, in social networks.

In the prior art there are different techniques for analyzing well known multimedia elements. For example, when analyzing the name Leonardo DiCaprio and Kate Elizabeth Winslet embedded in a post, the post may be identified as related to the movie "Titanic". A problem may arise when unknown, or unrecognizable multimedia elements should be identified or associated with common references that may be further analyzed.

It would therefore be advantageous to provide a solution for analyzing and identifying unknown multimedia elements within the multimedia content item.

SUMMARY

Certain embodiments disclosed herein include a method and server for analyzing a multimedia content item. The method comprises receiving a multimedia content item; extracting from the multimedia content item a plurality of multimedia elements; generating at least one signature for each of the plurality of multimedia elements; for each of the plurality of multimedia elements, querying a deep-content-classification (DCC) system to identify at least one concept that matches one of the plurality of multimedia elements, wherein querying is performed using the at least one signature generated for the multimedia elements and wherein an unidentified multimedia content element does not have a matching concept; generating a context for the multimedia content item using matching concepts; and characterizing each unidentified multimedia element using the generating context and signatures of the matching concepts.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiment will be apparent from the following detailed description taken in conjunction with the accompanying drawings.

DETAILED DESCRIPTION

Figure 1:
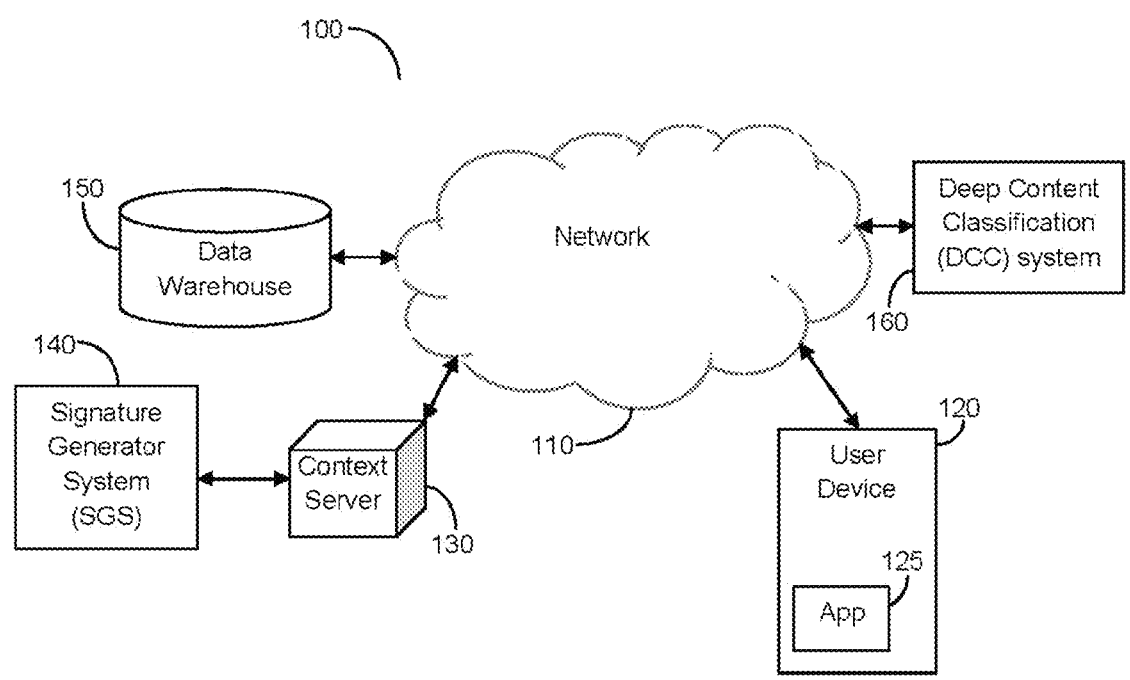
FIG. 1 is a schematic block diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein provide a system and method for analyzing a multimedia element found in a multimedia content item for the purpose of identifying the one or more concepts that can be associated with the multimedia element. In an embodiment, the system is configured to receive the multimedia content item comprised of a plurality of multimedia elements. Such multimedia elements can be associated with a plurality of pre-identified concepts (or concept structures) as well as some multimedia elements that are not yet identified. According to various exemplary embodiments, the unidentified multimedia elements can be partially identified or characterized using a context of the multimedia content item and the pre-identified concepts.

A concept (or a concept structure) is a collection of signatures representing a multimedia element and metadata describing the concept. The collection is a signature reduced cluster generated by inter-matching the signatures generated for the many multimedia elements, clustering the inter-matched signatures, and providing a reduced cluster set of such clusters. As a non-limiting example, a 'Superman concept' is a signature reduced cluster of signatures describing elements (such as multimedia elements) related to, e.g., a Superman cartoon: a set of metadata representing textual representation of the Superman concept. Techniques for generating concepts and concept structures are also described in the U.S. Pat. No. 8,266,185 (hereinafter the '185 patent) to Raichelgauz, et al., which is assigned to common assignee, and is incorporated hereby by reference for all that it contains. A context is a set of common patterns among concepts. Mathematically, a context can be represented as a matrix of co-occurrences of concepts. A threshold may be associated with the number of co-occurrences of concepts in the matrix to establish a context. Techniques for generating contexts are discussed below.

FIG. 1 shows an exemplary and non-limiting schematic diagram of a network system 100 (referred hereinafter as system 100) utilized to describe the various embodiments disclosed herein. A network 110 is used to communicate between different parts of the system 100. The network 110 may be the Internet, the world-wide-web (WWW), a local area network (LAN), a wide area network (WAN), a metro area network (MAN), and other networks capable of enabling communication between the components of the system 100.

Further connected to the network 110 is a user device 120 configured to execute at least one application 125. The application 125 may be, for example, a web browser (WB) or any application programmed to send the multimedia content items to a context server 130 and receive information respective of the processing of the multimedia content items by the context server 130 as further described below. The user device 120 is a computing device including, for example, a personal computer (PC), a personal digital assistant (PDA), a mobile phone, a smart phone, a tablet computer, a wearable computing device, and other kinds of wired and mobile appliances, equipped with browsing, viewing, listening, filtering, and managing capabilities etc., that are enabled as further discussed herein below. It should be noted that the one user device 120 and application 125 are illustrated in FIG. 1 only for the sake of the sake of simplicity and without limitation on the generality of the disclosed embodiments.

The system 100 also includes a data warehouse 150 configured to store the multimedia content items, multimedia elements, signature(s) generated for the multimedia elements, generated concepts for multimedia elements, and so on. In the embodiment illustrated in FIG. 1, the context server 130 communicates with the data warehouse 150 through the network 110. In other non-limiting configurations, the context sever 130 is directly connected to the data warehouse 150.

The various embodiments disclosed herein are realized using the context server 130, a signature generator system (SGS) 140 and a deep-content-classification (DCC) system 160. The context server 130 is configured to analyze the received multimedia content items for associating unidentified multimedia elements with a pre-identified concept or to characterize the unidentified multimedia elements. To this end, the context server 130 is communicatively connected to the SGS 140 and the DCC system 160. In an embodiment, the DCC system 160 is configured and operates as the DCC system discussed in the '185 patent. According to the disclosed embodiments, the context server 130 queries the DCC system 160 to identify the concept structure of multimedia elements of the received multimedia content item. This can be performed, for example and without limitation, by providing a query to the DCC system 160 for finding a match between a concept and a multimedia element (or its signature).

The context server 130 is further enabled to receive and serve the multimedia content items and/or multimedia elements and to cause the SGS 140 to generate signature(s) respective thereof. The process for generating the signatures is explained in more detail herein below with respect to FIGS. 3 and 4. The DCC system 160 and the SGS 140 may be connected to the context server 130 through the network 110 or through a direct connection. In certain configurations, the DCC system 160 and the SGS 140 may be embedded in the context server 130.

It should be noted that each of the context server 130, the SGS 140, and DCC system 160 typically comprise a processing unit, such as a processor (not shown) or an array of a processor coupled to a memory. In one embodiment, the processing unit may be realized through architecture of computational cores described in detail below. The memory contains instructions that can be executed by the processing unit. The context server 130 also includes an interface (not shown) to the network 110.

In an embodiment, the context server 130 is configured to analyze a multimedia content item to determine a context of the multimedia content item. The multimedia content item may be extracted from a web-page, received from the user device 120, or alternatively, retrieved from the data warehouse 150. The multimedia content item may be, but is not limited to, an image, a graphic, a video stream, a video clip, an audio stream, an audio clip, a video frame, a photograph, and an image of signals (e.g., spectrograms, phasograms, scalograms, etc.), and/or combinations thereof and portions thereof.

In one embodiment, the context server 130 receives a URL of the web-page viewed by the user device 120 and accessed by the application 125. The web-page is processed to extract the multimedia content item contained therein. The request to analyze the multimedia content item can be sent by a script executed in the web-page, such as the application 125 (e.g., a web server or a publisher server) when requested to upload one or more multimedia content items to the web-page. Such a request may include a URL of the web-page or a copy of the web-page. Moreover, the request to analyze the multimedia content item may include determining the context of the multimedia content item and identification of each multimedia element contained in the multimedia content item. A process for determining such a context is discussed in detail with reference to FIG. 5.

As noted above, the context is a set of common patterns among concepts. Each concept (or concept structure) is a collection of signatures representing one multimedia element and metadata describing the concept. The collection is a signature reduced cluster generated by inter-matching signatures generated by the SGS 140 for the many multimedia elements.

In one embodiment disclosed herein, the context server 130 is configured to analyze an input multimedia content item for the purpose of identification and characterization of the multimedia elements of which the multimedia content item is comprised. As an example, the multimedia content item may be a picture of a human face. The multimedia elements of the picture comprise a head, ears, eyes, nose, neck, of the human face and some accessories, e.g., an earring, a hat, and the like. Some of the multimedia elements are identifiable through known concepts, but some are not. To determine which of the multimedia elements are associated with a predefined concept, at least one signature is generated for each multimedia element. Then, using the generated signature(s), the DCC system 160 is queried to determine if there is a match to at least one concept.

For multimedia element matching concepts, the signatures of matching concepts are returned. For multimedia elements that do not match a concept, the at least one signature of each unidentified multimedia element is analyzed with respect to signatures of the matching concepts and the context by which to identify a ratio of sizes, angles, scale, location and orientation of the unidentified multimedia element's signatures with respect to the concepts signatures and the context. The analysis may include correlation between the signatures. For example, it can be determined based on the signatures' analysis that the unidentified multimedia element is an object that is relatively large relative to an adjacent object. In an embodiment, one or more probabilistic models can then be utilized to identify, for example, the probability that a signature will appear in a similar orientation as another signature.

Following the above example, the human face includes an earring on the left ear. The earring is an unidentified multimedia element, and the eyes, nose, head, and ears are identified as multimedia elements with matching concepts. Based on the signatures analysis, the ears are determined to be relatively small compared to the head and the unidentified multimedia element (earring) is determined to be relatively smaller than the left ear and that their location is partially overlapped. Thus, the unidentified multimedia element is determined be "an object placed on the ear and covering a part of the ear." The textual characterization may be performed using the metadata of the matching concepts.

Figure 2:
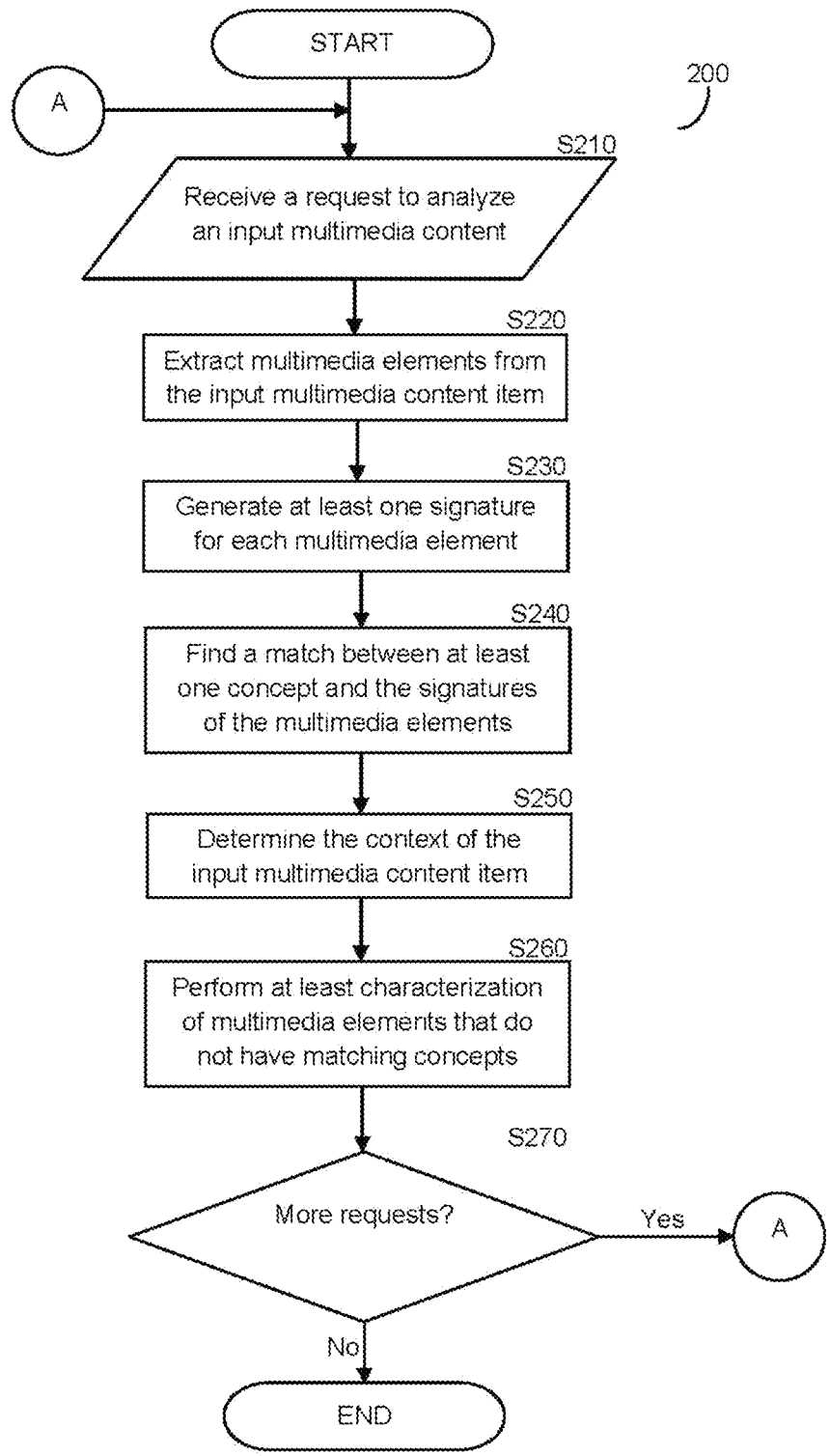
FIG. 2 is a flowchart describing a method for analyzing a multimedia element that is not yet associated with any known concept according to an embodiment.

FIG. 2 depicts an exemplary and non-limiting flowchart 200 describing a method for analyzing multimedia elements in a multimedia content item according to one embodiment. In S210, a request to analyze an input multimedia content item is received. The multimedia content item may be extracted from a web-page, received from the user device 120, or alternatively, retrieved from a storage, such as, the data warehouse 150. The request may be received by a script executed in the web-page, such as the application 125 (e.g., a web server or a publisher server) when the multimedia content item is uploaded to the webpage. The request may include a URL of the web-page or a copy of the web-page.

In S220, multimedia elements are extracted from the input multimedia content item. In S230, at least one signature is generated for each multimedia element. The generated signature(s) are robust for noise and distortion. The signature generation is performed by the SGS 140 as described below with respect to FIGS. 3 and 4.

In S240, the DCC system (e.g., system 160) is queried to find a match between at least one concept and the multimedia elements using their respective signatures. In an embodiment, at least one signature generated for a multimedia element is matched against the signature (signature reduced cluster (SRC)) of each concept maintained by the DCC system 160. If the signature of the concept overlaps the signature of the multimedia element more than a predetermined threshold level, a match exists. Various techniques for determining matching concepts are discussed in the '185 patent. For each matching concept the respective multimedia element is determined to be identified and the concept signature (SRC) is returned.

In S250, the context of the input multimedia content item is determined using the generated signatures and identified concepts as described below with respect to FIG. 5.

In S260, at least characterization of unidentified multimedia elements, i.e., multimedia elements that do not have matching concepts is performed. This includes correlation of such signatures with respect to the determined context and signatures of matching concepts. In one embodiment, such analysis includes identification of a ratio of sizes, angles, scale, location and orientation of the signatures (both of the concept and unidentified elements) among themselves as well as with respect to the context. Using probabilistic models, the analysis further determines the probability that a signature of an unidentified element will appear in a similar orientation and/or location as a concept's signature.

In an embodiment, the characterization of unidentified multimedia elements together with their signatures are saved in a data warehouse 150 for future use (such as for identification of objects appear in multimedia content item). In S270, it is checked whether there are additional requests to analyze input multimedia content items, and if so, execution continues with S210; otherwise, execution terminates.

Figure 3:
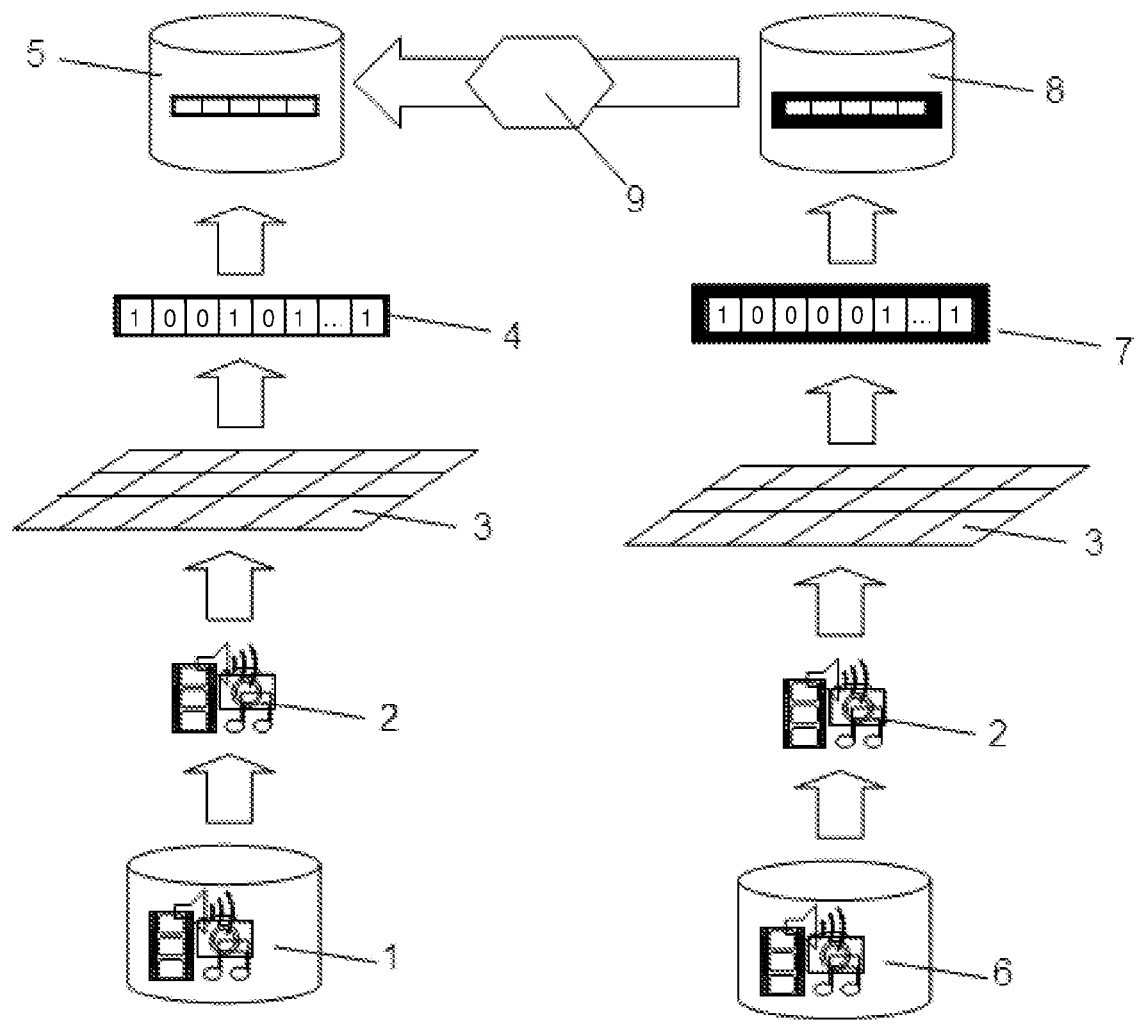
FIG. 3 is a block diagram depicting the basic flow of information in the signature generator system.
Figure 4:
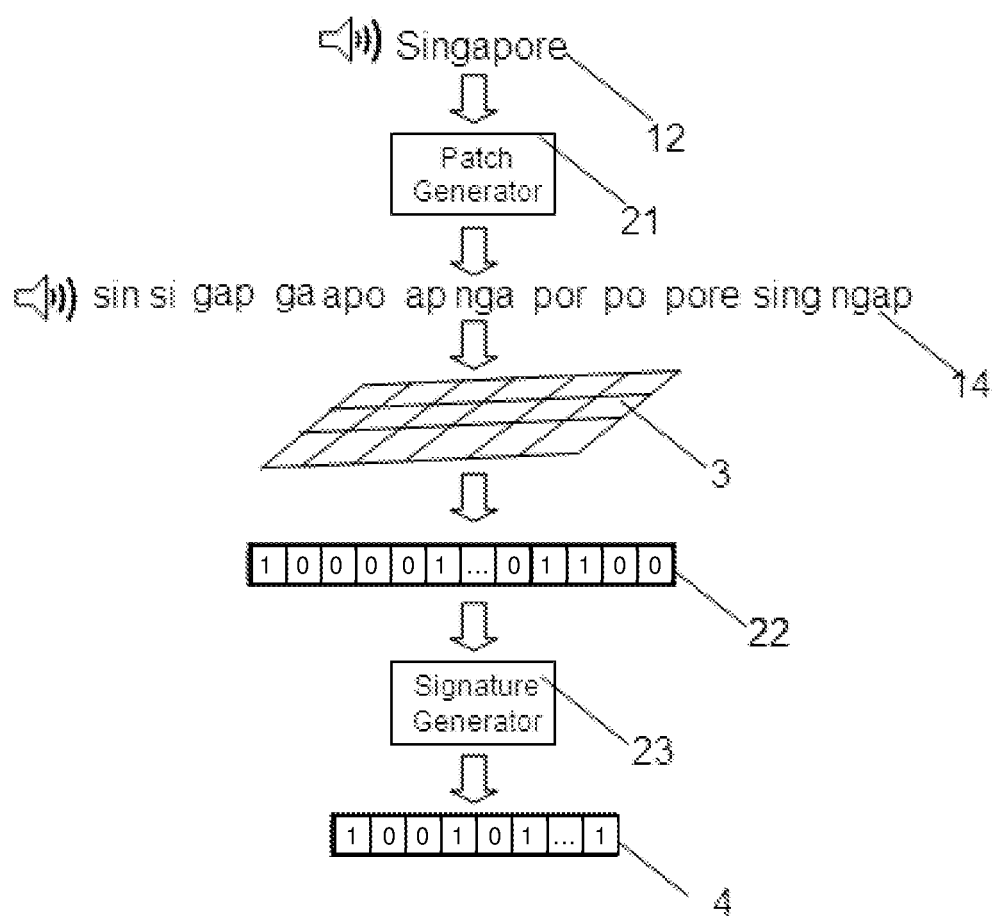
FIG. 4 is a diagram showing the flow of patches generation, response vector generation, and signature generation in a large-scale speech-to-text system.

FIGS. 3 and 4 illustrate the generation of signatures for the multimedia elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(Vi - Th_x)$$

where, $\ominus$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_X$ is a constant Threshold value, where 'x' is 'S' for Signature and 'RS' for Robust Signature; and Vi is a Coupling Node Value.

The Threshold values $Th_X$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

For: $V_i > Th_{RS}$ $1-p(V-Th_S)-1-(1-\epsilon)^1 \ll 1$      1:

i.e., given that l nodes (cores) constitute a Robust Signature of a certain image I, the probability that not all of these I nodes will belong to the Signature of same, but noisy image, ▲ is sufficiently low (according to a system's specified accuracy).

$p(V_i > Th_{RS}) \approx l/L$      2:

i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the co-pending U.S. patent application Ser. No. 12/084,150 referenced above.

Figure 5:
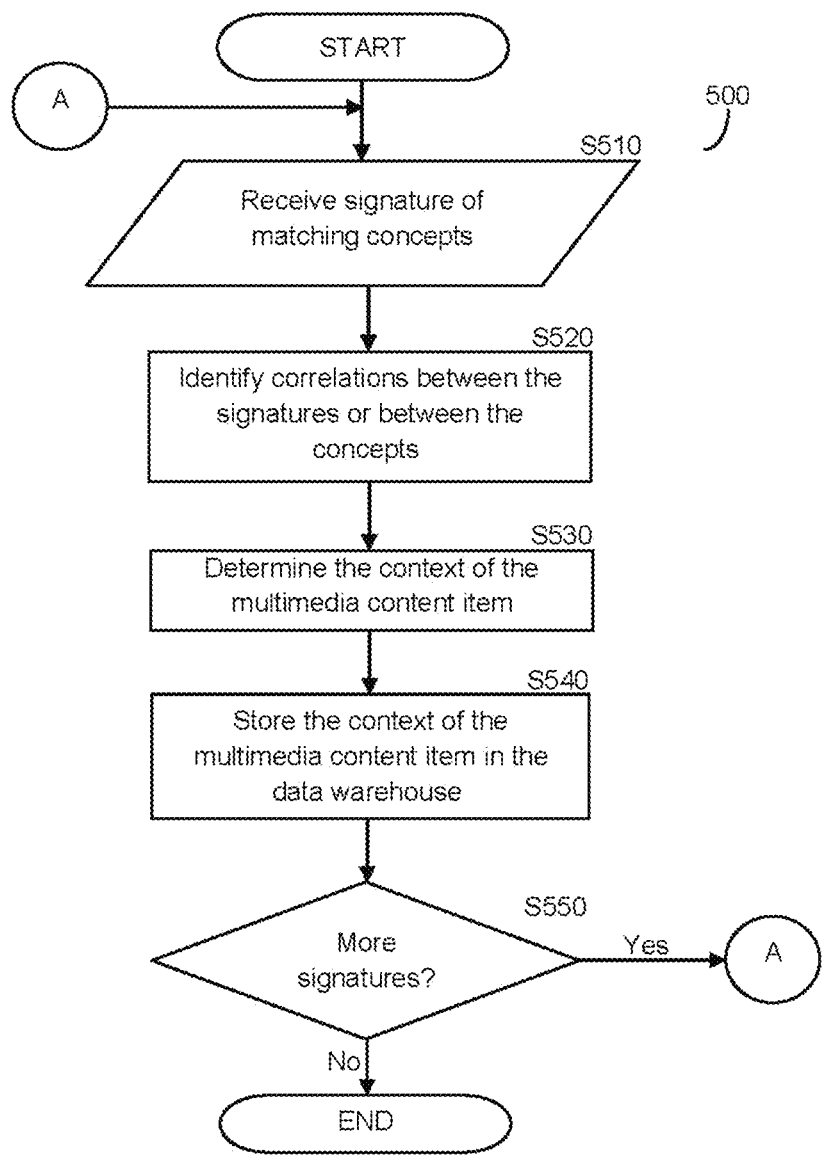
FIG. 5 is a flowchart describing a method for determining a context of a multimedia content item by analyzing known concepts according to an embodiment.

FIG. 5 depicts an exemplary and non-limiting flowchart 500 describing a method for determining a context of a multimedia content item according to one embodiment. In S510, the method starts when signatures of matching concepts (see, S230, FIG. 2) are received.

In S520, correlations between the generated signatures, or alternatively, between the concepts, are identified. In an embodiment, identification of a ratio between signatures' sizes, a spatial location of each signature, and so on using probabilistic models are performed. Then, by identifying, for example, the ratio of signatures' sizes, the ratio between the sizes of their respective multimedia elements may be determined.

A context is determined as the correlation between the concepts (respective of their signatures). A strong context is determined when there are more concepts, or the plurality of concepts, satisfy the same predefined condition. As an example, the analysis of signatures generated for an image showing a smiling child with a Ferris wheel in the background is performed. The concept of the signature generated for the smiling child is "amusement". The concept of the signature generated for the Ferris wheel is "amusement park". The correlation between the concept's signatures of the smiling child and the Ferris wheel determines that the Ferris wheel is bigger than the child and leads to the conclusion that the Ferris wheel is used to entertain the smiling child. Thus, the determined context of the image is "amusement."

According to one embodiment, the context server 130 uses one or more typically probabilistic models to determine the correlation between the signatures. Such probabilistic models may determine, for example, the probability that one signature may appear in the same orientation and in the same ratio as another signature. When performing the analysis, the context server 130 is configured to use information maintained in the data warehouse 150, for example, signatures that were previously analyzed.

In S530, the context server 130 determines, based on the analysis performed in S520, the context of the multimedia content item. In S540, the context of the multimedia content item is stored in the data warehouse 150 for future use. In S550, it is checked whether there are additional signatures of matching concepts and if so execution continues with S510; otherwise, execution terminates.

Following is another non-limiting example demonstrating the operation of the context server 130. In this example, an image containing a plurality of multimedia elements is received. According to this example, the DCC system 160 identified concepts of a "glass", a "cutlery" and a "plate". The context server 130 then analyzes the correlation between the concepts respective of their signatures. As an example, such information may be analysis of previously generated signatures. According to this example, as all the concepts of the "glass", the "cutlery", and the "plate" satisfy the same predefined condition, a strong context is determined. The context of such concepts may be a "table set". The context can be also determined respective of a ratio of the sizes of the objects (glass, cutlery, and plate) in the image and the distinction of their spatial orientation.

Also included in the multimedia element is a salt cellar. The DCC system 160 does not identify any concept matching the salt cellar. However, using the process described above, the signature generated for the salt cellar can be correlated to signatures of the identified concepts to characterize the salt cellar as an "object of tableware."

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for analyzing multimedia content items, comprising:
   receiving a multimedia content item;
   extracting from the multimedia content item a plurality of multimedia elements;
   generating at least one signature for each of the plurality of multimedia elements;
   querying a deep-content-classification (DCC) system to identify at least one concept that matches at least one of the plurality of multimedia elements, wherein querying is performed using the at least one signature generated for the multimedia elements and wherein a multimedia element is unidentified when the multimedia element does not have a matching concept identified via the querying;
   generating a context for the multimedia content item using matching concepts; and
   characterizing each unidentified multimedia element using the generated context and signatures of the identified at least one concept.

2. The method of claim 1, wherein the multimedia content item is at least one of: an image, a graphic, a video stream, a video clip, an audio stream, an audio clip, a video frame, a photograph, and images of signals.

3. The method of claim 2, wherein the images of signals are one of: medical signals, geophysical signals, subsonic signals, supersonic signals, electromagnetic signals, infrared signals, an audio signal, a video signal, coordinates, and a sonography signal.

4. The method of claim 1, wherein the at least one signature generated for each of the plurality of multimedia elements is robust to noise and distortions.

5. The method of claim 1, wherein a matching concept is a collection of signatures representing a multimedia element and metadata describing the concept, wherein the collection is a signature reduced cluster generated by inter-matching signatures generated for the plurality of multimedia elements, wherein the matching concept is represented using at least one signature.

6. The method of claim 1, wherein a concept is determined to match a multimedia element when the at least one signature of the concept matches at least one signature generated for the multimedia element over a predefined threshold.

7. The method of claim 5, wherein upon identification of each matching concept the at least one signature representing the concept and metadata matching the concept are returned.

8. The method of claim 7, wherein characterization of each unidentified multimedia content element is performed in part using metadata of the matching concepts.

9. The method of claim 8, wherein the characterization of each unidentified multimedia element includes a correlation of the at least one signature of the unidentified multimedia element against signatures of the matching concepts and signatures of the generated context.

10. The method of claim 9, wherein the correlation of the at least one signature of the unidentified multimedia content element against signatures of the matching concepts further comprising:
    identifying any one of a ratio of sizes, angles, scale, location and orientation between the at least one signature of the unidentified multimedia element and signatures of the matching concepts.

11. The method of claim 10, wherein the correlation of the at least one signature of the unidentified multimedia element against signatures of the matching concepts is performed by at least one probabilistic model.

12. A non-transitory computer readable medium having stored thereon instructions for causing one or more processing units to execute the method according to claim 1.

13. A server for analyzing a multimedia content item, comprising:
an interface to a network for receiving a multimedia content item;
a processor; and
a memory connected to the processor, the memory contains instructions that when executed by the processor, configure the server to:
extract from the multimedia content item a plurality of multimedia elements;
generate at least one signature for each of the plurality of multimedia elements;
query a deep-content-classification (DCC) system to identify at least one concept that matches at least one of the plurality of multimedia content elements, wherein querying is performed using the at least one signature generated for the multimedia elements and wherein a multimedia element is unidentified when the multimedia element does not have a matching concept identified via the query;
generate a context for the multimedia content item using the matching concepts; and
characterize each unidentified multimedia element using the generated context and signatures of the identified at least one concept.

14. The server of claim 13, wherein the multimedia content item is at least one of: an image, a graphic, a video stream, a video clip, an audio stream, an audio clip, a video frame, a photograph, and images of signals.

15. The server of claim 14, wherein the images of signals are one of: medical signals, geophysical signals, subsonic signals, supersonic signals, electromagnetic signals, infrared signals, an audio signal, a video signal, coordinates, and a sonography signal.

16. The server of claim 13, wherein a matching concept is a collection of signatures representing a multimedia element and metadata describing the concept, wherein the collection is a signature reduced cluster generated by inter-matching signatures generated for the plurality of multimedia elements, wherein the matching concept is represented using at least one signature.

17. The server of claim 13, wherein a concept is determined to match a multimedia element when the at least one signature of the concept matches at least one signature generated for the multimedia element over a predefined threshold.

18. The server of claim 17, wherein upon identification of each matching concept the at least one signature representing the concept and metadata matching the concept are returned.

19. The server of claim 18, wherein characterization of each unidentified multimedia element is performed in part using metadata of matching concepts.

20. The server of claim 19, wherein the characterization of each unidentified multimedia element includes a correlation of the at least one signature of the unidentified multimedia element against signatures of the matching concepts and signatures of the generated context.

21. The server of claim 20, wherein the correlation of the at least one signature of the unidentified multimedia element against signatures of the matching concepts further comprises identifying any one of a ratio of sizes, angles, scale, location and orientation between the at least one signature of the unidentified multimedia element and signatures of the matching concepts.

22. The server of claim 21, wherein the correlation of the at least one signature of the unidentified multimedia element against signatures of the matching concepts is performed by at least one probabilistic model.

* * * * *